(12) United States Patent
Shafiq et al.

(10) Patent No.: US 8,530,600 B2
(45) Date of Patent: Sep. 10, 2013

(54) THERMOPLASTIC POLYURETHANES AND THEIR USE

(75) Inventors: Faisal Shafiq, Krefeld-Fischeln (DE); Christian Wamprecht, Neuss (DE); David Pucket, Grenoble (FR)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 13/096,612

(22) Filed: Apr. 28, 2011

(65) Prior Publication Data

US 2012/0007270 A1  Jan. 12, 2012

(30) Foreign Application Priority Data

Apr. 28, 2010 (EP) .................................... 10305448

(51) Int. Cl.
*C08G 77/04* (2006.01)
(52) U.S. Cl.
USPC ................... 528/28; 528/48; 528/65; 528/76; 528/80; 528/85

(58) Field of Classification Search
USPC ............................. 528/28, 48, 65, 76, 85, 80
See application file for complete search history.

(56) References Cited

U.S. PATENT DOCUMENTS

| | | | | |
|---|---|---|---|---|
| 6,080,489 A | * | 6/2000 | Mehta | 428/447 |
| 6,930,162 B2 | * | 8/2005 | Brauer et al. | 528/65 |
| 2006/0045996 A1 | * | 3/2006 | Fujibayashi et al. | 428/31 |
| 2007/0265413 A1 | | 11/2007 | Peerlings et al. | |
| 2009/0192274 A1 | * | 7/2009 | Peerlings et al. | 525/453 |

FOREIGN PATENT DOCUMENTS

| | | | |
|---|---|---|---|
| DE | 1964834 A1 | | 7/1971 |
| DE | 2901774 A1 | | 7/1980 |
| DE | 10230020 A1 | | 1/2003 |
| DE | 10230020 A1 | * | 1/2003 |
| EP | 1854818 A1 | | 11/2007 |
| EP | 2083026 A2 | | 7/2009 |
| GB | 1057018 A | | 2/1967 |

* cited by examiner

*Primary Examiner* — Michael L Leonard
(74) *Attorney, Agent, or Firm* — Novak Druce Connolly Bove + Quigg LLP

(57) ABSTRACT

This invention concerns thermoplastic polyurethane mouldings with improved surface resistance (resistance to writing and scratching) and very good technical processability as well as their use.

15 Claims, No Drawings

THERMOPLASTIC POLYURETHANES AND THEIR USE

CROSS REFERENCE TO RELATED APPLICATIONS

This application claims benefit of European application 10305448.2, filed Apr. 28, 2010, which is incorporated herein by reference in its entirety for all useful purposes.

BACKGROUND

This invention concerns thermoplastic polyurethane mouldings with very high surface resistance (resistance to writing, scratching and abrasion) and very good technical processability with a large processing window as well as their use.

Thermoplastic polyurethanes (TPU) are of great technical importance because of their good elastomer properties and thermoplastic processability. An overview of the production, properties and applications of TPU is given for example in the Plastics Handbook [G. Becker, D. Braun], volume 7 "Polyurethane", Munich, Vienna, Carl Hanser Publishing, 1983.

TPU are made up mostly of linear polyols (macrodiols), such as polyester, polyether or polycarbonate diols, organic diisocyanates and short chain, mostly difunctional alcohols (chain lengtheners). They may be produced continuously or discontinuously. The best known production processes are the band process (GB-A 1 057 018) and the extrusion process (DE-A 19 64 834).

Thermoplastically processable polyurethane elastomers may be made up either step by step (prepolymer dosing process) or by the simultaneous reaction of all components in one stage (one shot dosing process).

In DE-A 102 30 020 the use of polyorganosiloxanes to improve resistance to scratching and rubbing (mechanical surface resistance) for TPU is described. Though when processing TPU, which contain these additives, after some time (after some shots) in the injection moulding process surface disturbances occur, which lead to undesirable, high rejection rates.

In EP-A 2 083 026 the use of special mixtures of low molecular and high molecular polyorganosiloxanes to improve resistance to scratching and rubbing (mechanical surface resistance) for TPU is described. Though when processing TPUs, which contain these additive mixtures, at low processing temperatures (<180° C.) in the injection moulding process surface disturbances and delamination occasionally occur, which lead to undesirable, high rejection rates.

BRIEF DESCRIPTION OF PREFERRED EMBODIMENTS

The purpose of this invention was therefore to make thermoplastic polyurethanes (TPU) available, which have very good mechanical surface resistance and at the same time excellent technical processability, particularly a wide processing window with reference to the processing temperature, as well as having no surface disturbances, particularly delamination, during processing.

This purpose could be met by TPUs with a special composition.

The subject of this invention is therefore thermoplastic polyurethanes, which may be obtained from
a) one or several organic diisocyanates,
b) at least one low molecular polyol with on average at least 1.8 and at most 3.0 Zerewitinoff-active hydrogen atoms and an average molecular weight $M_n$ of 60 to 400 g/mol as a chain lengthener and
c) at least one polyol component with an average molecular weight $M_n$ of 450 to 10,000 g/mol and on average at least 1.8 to at most 3.0 Zerewitinoff-active hydrogen atoms, in which the ratio of the number of isocyanate groups in components a) to the number of groups, which are reactive to isocyanate, in components b), c) and if necessary g) is 0.9:1 to 1.1:1,
with the addition of
e) catalysts if necessary,
f) additives and/or auxiliary materials if necessary,
g) chain breakers if necessary
and which contain
d) 0.4 to 10% by weight with reference to thermoplastic polyurethane of a mixture of
  d1) 0.1 to 4% by weight with reference to thermoplastic polyurethane of at least one amorphous and/or crystalline silicon dioxide,
  and special polyorganosiloxane mixtures of the general formula $(R_2SiO)_n$, in which R represents an organic hydrocarbon residue, which may be made linear as well as branched, and has 1 to 27 carbon atoms, and n may be a whole number from 3 to 8,000, in which the polyorganosiloxane mixture consists of
  d2) 0 to 2% by weight with reference to thermoplastic polyurethane of one or several polyorganosiloxanes $(R_2SiO)_n$ with n=3 to 300 and
  d3) 0,2 to 8% by weight with reference to thermoplastic polyurethane of one or several polyorganosiloxanes $(R_2SiO)_n$ with n=1,000 to 8,000.

Chain lengtheners may also be referred to as "chain extenders". Chain breakers may also be referred to as "chain terminators".

The value "n" represents the degree of polymerization, also called DP, which is the number of repeat units in an average polymer chain at time t in a polymerizationreaction. The length is in monomerunits. The degree of polymerization is a measure of molecular weight(MW). For a homopolymer, the number-average degree of polymerization may be calculated as the total MW of the polymer divided by the MW of the repeating unit.

DETAILED DESCRIPTION OF PREFERRED EMBODIMENTS

Aliphatic, cycloaliphatic, araliphatic, aromatic and heterocyclic diisocyanates or any mixtures of these diisocyanates may be used as organic diisocyanate (a) (see HOUBEN-WEYL "Methods in Organic Chemistry", volume E20 "Macromolecular Materials", Georg Thieme Publishing, Stuttgart, New York 1987, pages 1587-1593, or Justus Liebig's Chemistry Annals, 562, pages 75 to 136).

Individual examples may be indicated as: aliphatic diisocyanates, such as ethylene diisocyanate, 1.4-tetramethylene diisocyanate, 1.6-hexamethylene diisocyanate, 1.12-dodecane diisocyanate; cycloaliphatic diisocyanates, such as isophorone diisocyanate, 1.4-cyclohexane diisocyanate, 1-methyl-2.4-cyclohexane diisocyanate and 1-methyl-2.6-cyclohexane diisocyanate as well as the corresponding isomer mixtures, 4.4'-dicyclohexylmethane diisocyanate, 2.4'-dicyclohexylmethane diisocyanate and 2.2'-dicyclohexylmethane diisocyanate as well as the corresponding isomer mixtures; also aromatic diisocyanates, such as 2.4-toluylene diisocyanate, mixtures of 2.4-toluylene diisocyanate and 2.6-toluylene diisocyanate, 4.4'-diphenylmethane diisocyanate, 2.4'-diphenylmethane diisocyanate and 2.2'-diphenylmethane diisocyanate, mixtures of 2.4'-diphenylmethane diisocyanate and 4.4'-diphenylmethane diisocyanate, urethane modified or carbodiimide modified liquid 4.4'-diphenylmethane diisocyanate or 2.4'-diphenylmethane diisocyanate, 4.4'-diisocyanatodiphenylethane-(1.2) and 1.5-naphthylene diisocyanate. Preferably used are 1.6-hexamethylene diisocyanate, 1.4-cyclohexane diisocyanate, isophorone diisocyanate, dicyclohexylmethane diisocyanate, diphenylmethane diisocyanate isomer mixtures with a 4.4'-diphenylmethane diisocyanate content of more than 96% by weight and in particular 4.4'-diphenylmethane diisocyanate and 1.5-naphthylene diisocyanate are used. The diisocyanates indicated may be used individually or in the form of mixtures. They may also be used together with up to 15 Mol % (calculated based on the total diisocyanate) of a polyisocyanate, but at most only as much polyisocyanate may be added so that a product is produced, which is still thermoplastically processable. Examples of polyisocyanates are triphenylmethane-4.4',4"-triisocyanate and poly-phenyl-polymethylene polyisocyanate.

The chain lengthening agents b) have on average preferably 1.8 to 3.0 Zerewitinoff-active hydrogen atoms and have a molecular weight of 60 to 400. These are understood to be preferably those with two to three, particularly preferably with two hydroxyl groups.

Preferably used as chain lengtheners b) are one or several compounds from the group of aliphatic diols with 2 to 14 carbon atoms, such as for example ethanediol, 1.2-propanediol, 1.3-propanediol, 1.4-butanediol, 2.3-butanediol, 1.5-pentanediol, 1.6-hexanediol, 1.10-decanediol, 1.12-dodecanediol, diethylene glycol, dipropylene glycol, 1.4-cyclohexanediol, 1.4-dimethanol cyclohexane and neopentyl glycol. But also suitable are diesters of terephthalic acid with glycols with 2 to 4 carbon atoms, for example terephthalic acid-bis-ethylene glycol or terephthalic acid-bis-1.4-butanediol, hydroxyalkylene ether of hydroquinone, for example 1.4-di(β-hydroxyethyl)-hydroquinone, ethoxylated bisphenols, for example 1.4-di(β-hydroxyethyl)-bisphenol A. The diols indicated may also be converted with different molar amounts of ε-caprolactone with a ring opening reaction so that the corresponding chain lengtheners with higher molecular weights are produced. Particularly preferably used as chain lengtheners are ethanediol, 1.4-butanediol, 1.6-hexanediol, 1.4-dimethanol cyclohexane, 1.4-di(β-hydroxyethyl)-hydroquinone or 1.4-di(β-hydroxyethyl)-bisphenol A and their conversion products with ε-caprolactone. Smaller amounts of triols may also be added.

Used as polyol components c) are those with on average at least 1.8 to at most 3.0 Zerewitinoff-active hydrogen atoms and a number average molecular weight $\overline{M}_n$ of 450 to 10,000. Depending on production the polyols often contain small amounts of non-linear compounds. Therefore "essentially linear polyols" are often spoken of. Preferred are polyester, polyether and polycarbonate diols or mixtures of them.

In particular compounds are preferred, which have two to three, preferably two hydroxyl groups, especially those with number average molecular weights $\overline{M}_n$ of 450 to 6,000, preferably those with number average molecular weights $\overline{M}_n$ of 600 to 4.500; particularly preferably those with number average molecular weights $\overline{M}_n$ of 800 to 3,000. Polyesters, polyethers and polycarbonates, which have hydroxyl groups, are particularly preferred.

Suitable polyether diols may be produced by one or several alkylene oxides with 2 to 4 carbon atoms in the alkylene residue being converted with a starter molecule, which contains two bonded active hydrogen atoms. Examples of alkylene oxides may be indicated as: ethylene oxide, 1.2-propylene oxide, epichlorohydrin and 1.2-butylene oxide and 2.3-butylene oxide. Preferably used are ethylene oxide, propylene oxide and mixtures of 1.2-propylene oxide and ethylene oxide. Alkylene oxides may be used individually, alternately one after the other, or as mixtures. Examples of starter molecules may be considered as: water, amino alcohols, such as N-alkyl diethanolamine, for example N-methyldiethanolamine, and diols, such as ethylene glycol, 1.3-propylene glycol, 1.4-butanediol and 1.6-hexanediol. Mixtures of starter molecules may also be used if necessary. Suitable polyether polyols are also the polymerisation products of tetrahydrofurane, which contain hydroxyl groups. Trifunctional polyethers may also be used in proportions of 0 to 30% by weight with reference to bifunctional polyethers, but at most in such an amount that a product is produced, which is still thermoplastically processable. Essentially linear polyether diols preferably have number average molecular weights $\overline{M}_n$ of 450 to 6,000. They may be used individually as well as in the form of mixtures.

Suitable polyester diols may be produced for example from dicarbonic acids with 2 to 12 carbon atoms, preferably 4 to 6 carbon atoms, and polyvalent alcohols. Examples of dicarbonic acids are considered as: aliphatic dicarbonic acids, such as succinic acid, glutaric acid, adipic acid, suberic acid, azelaic acid and sebacic acid, or aromatic dicarbonic acids, such as phthalic acid, isophthalic acid and terephthalic acid or possible cyclic anhydrides of them. Dicarbonic acids may be used individually or as mixtures, for example in the form of a succinic, glutaric and adipic acid mixture. To produce polyester diols instead of dicarbonic acids if necessary it may be advantageous to use the corresponding dicarbonic acid derivatives, such as carbonic acid diesters with 1 to 4 carbon atoms in the alcohol residue, carbonic acid anhydrides or carbonic acid chlorides. Examples of polyvalent alcohols are glycols with 2 to 10, preferably 2 to 6 carbon atoms, for example ethylene glycol, diethylene glycol, 1.4-butanediol, 1.5-pentanediol, 1.6-hexanediol, 1.10-decanediol, 1.12-dodecanediol, 2.2-dimethyl-1.3-propanediol, 1.3-propanediol or dipropylene glycol. Depending on the desired properties polyvalent alcohols may be used alone or in mixtures. Also suitable are esters of carbonic acid with the diols indicated, particularly those with 4 to 6 carbon atoms, such as 1.4-butanediol or 1.6-hexanediol, or esters of carbonic acid with conversion products of the diols indicated and ε-caprolactone. Condensation products of ω-hydroxycarbonic acids, such as ω-hydroxycapronic acid, or polymerisation products of lactones, for example if necessary substituted ω-caprolactones. Preferably used as polyester diols are ethanediol polyadipate, 1.4-butanediol polyadipate, ethanediol-1.4-butanediol polyadipate, 1.6-hexanediol-neopentyl glycol polyadipate, 1.6-hexanediol-1.4-butanediol polyadipate and polycaprolactone. Polyester diols have number average molecular weights $\overline{M}_n$ of 450 to 10,000 and may be used individually or in the form of mixtures.

Compounds of the general formula $SiO_2$, which are usual in the trade, may be used as products d1) in d). Examples may be indicated as modified and unmodified pyrogenic silicic acids.

Compounds of the general formula $(R_2SiO)_n$ are used as polyorganosiloxanes d2) and d3) in d), in which R represents an organic hydrocarbon residue, which may be made linear as well as branched, and has 1 to 27 carbon atoms. There are at least 3 and at most 8,000 repeat units. Polyorganosiloxanes d2) and d3) may be added as a substance or as a masterbatch in a carrier substance Considered as carrier substance are thermoplastic elastomers, such as for example polyether esters, polyester esters, thermoplastic polyurethanes (TPU), styrene ethylene butadiene styrene (SEBS), acrylonitrile butadiene styrene (ABS), styrene acrylonitrile (SAN), polyamide (PA), acrylate styrene acrylate block copolymer (ASA), polybutylene terephthalate (PBT), polycarbonate (PC), polyether block amide (PEBA), polymethyl methacrylate (PMMA), polyoxymethylene (POM) or polyvinylchloride (PVC). Preferred are thermoplastic polyurethanes, particularly preferred are aliphatic thermoplastic polyurethanes The silicone component d) may already be added to the TPU raw materials during production of the TPU or after to the finished TPU, for example by means of compounding.

The relative amounts of Zerewitinoff-active compounds are selected preferably so that the ratio of the number of isocyanate groups to the number of groups, which are reactive to isocyanate, is 0.9:1 to 1.1:1.

Suitable catalysts e) are the usual tertiary amines, which are known according to the state of the art, such as for example triethylamine, dimethylcyclohexylamine, N-methylmorpholine, N,N'-dimethylpiperazine, 2-(dimethylaminoethoxy)ethanol, diazabicyclo[2.2.2]octane and similar, as well as in particular organic metal compounds, such as titanic acid esters, iron compounds, bismuth compounds or tin compounds, such as tin diacetate, tin dioctoate, tin dilaurate, or dialkyl tin salts of aliphatic carbonic acids, such as dibutyl tin diacetate or dibutyl tin dilaurate or similar. Preferred catalysts are organic metal compounds, particularly titanic acid esters, iron, tin, zircon and bismuth compounds. The total amount of catalysts in the TPU according to the invention as a rule amounts to preferably 0 to 5% by weight, preferably 0 to 2% by weight, with reference to the total amount of TPU.

The thermoplastic polyurethanes according to the invention may contain auxiliary materials and additives f). Typical auxiliary materials and additives are lubricants and mould release agents, such as fatty acid esters, metal soaps from them, fatty acid amides, fatty acid ester amides, antiblocking agents, flame protection agents and softeners (for example such as described in M. Szycher in M. Szycher's Handbook of Polyurethanes, 1999, CRC Press, pages 8-28 to 8-30. Examples may be indicated as phosphates, carboxylates (such as for example phthalates, adipates and sebacates), silicons and alkylsulphonic acid esters), inhibitors, stabilisers against hydrolysis, heat and discolouration, light stabilisers (preferably UV stabilisers, antioxidants and/or MALS compounds. Further details may be found in the specialist literature and for example are described in Plastics Additives Handbook, 2001 5th Edition, Carl Hanser Publishing, Munich), colourings, pigments, anorganic and/or organic fillers, fungistatic and bacteriostatic substances and mixtures of them.

Further details of the auxiliary agents and additives indicated can be found in the specialist literature, for example the monograph by J. H. Saunders and K. C. Frisch "High Polymers", volume XVI, Polyurethane, part 1 and 2. Publishing Interscience Publishers 1962 or 1964. the Handbook for Plastic Additives by R. Gächter and H. Müller (Hanser Publishing Munich 1990) or DE-A 29 01 774.

Further additives, which may be worked into the TPU, are thermoplastics, for example poly-carbonates and acrylnitrile/butadiene/styrene terpolymers (ABS), particularly ABS. Other elastomers, such as rubber, ethylene/vinylacetate copolymers, styrene/butadiene copolymers as well as other TPU may also be used.

Auxiliary materials and additives f) may be added during the production process of the TPU and/or during additional compounding of the TPU.

Monofunctional compounds, which react to isocyanates, may be used in proportions of up to 2% by weight with reference to the TPU as so-called chain breakers g). Suitable are for example monoamines, such as butyl and dibutylamine, octylamine, stearylamine, N-methylstearylamine, pyrrolidine, piperidine or cyclohexylamine, monoalcohols such as butanol, 2-ethylhexanol, octanol, dodecanol, stearyl alcohol, the different amyl alcohols, cyclohexanol and ethylene glycol mono-methyl ether.

The TPU according to the invention are used preferably in the injection moulding process, extrusion process and/or powder slush process.

The TPU according to the invention are used preferably to produce heat resistant moulded parts and skins with very good mechanical and chemical surface resistance, particularly resistance to scratching.

The TPU are used preferably for fitting out the inside of motor vehicles.

The invention is explained in more detail using the following examples.

Abbreviations Used in the Following:

| | |
|---|---|
| PE 225B | polyester diol with a molecular weight of $M_n$ = 2250 g/mol; product of the company Bayer MaterialScience AG |
| Acclaim® 2220 N | polyether diol (mixed ether made of $C_3$ and $C_2$ alkylene units) with a molecular weight of $M_n$ = 2250 g/mol; product of the company Bayer MaterialScience AG |
| HDI | 1.6-hexamethylene diisocyanate |
| MDI | 4.4'-diphenylmethane diisocyanate |
| BDO | 1.4-butanediol |
| HQEE | 1.4-bis-(2-hydroxyethoxy)benzol |
| Cap-HDO | chain lengthener based on ε-caprolactone and 1.6-hexanediol according to EP 1 854 818 A1 |
| Irganox® 1010 | antioxidant from the company Ciba Specialty Chemicals GmbH |
| Tinuvin® 234 | light stabiliser based on a benzotriazole from the company Ciba Specialty Chemicals GmbH |
| EBS | ethylene-bis-stearylamide |
| DBTL | dibutyl tin laurate |
| SO | tin dioctoate |
| MB40-817 | siloxane masterbatch from Dow Corning consisting of 26% by weight with reference to siloxane masterbatch of polyorganosiloxane (n ~ 6000), 14% silicon dioxide and 60% aliphatic TPU |
| MB50-027 | siloxane masterbatch from Dow Corning consisting of polyorganosiloxane (n~6000) and an aliphatic TPU |
| M350 | polyorganosiloxane with n~100-150; silicon oil from the company GE Silicones |

EXAMPLES

Production of an Aromatic TPU (TPU-1):

A mixture of 643 g PE 225B, 71 g BDO, 2 g Irganox® 1010, 5 g Tinuvin® 234. 2 g EBS and 50 ppm SO (with reference to the amount of polyol) was heated to 160° C. by agitating with an impeller agitator at a speed of 500 revolutions per minute (rpm). Then 273 g MDI were added. Then it was agitated to the maximum possible increase in viscosity and then the TPU was poured. The material was subsequently heat treated for 30 minutes at 80° C. and then granulated. This material was used as the basic material for examples 1 to 3.

Production of an Aliphatic TPU (TPU-2):

A mixture of 500 g PE 225B, 214 g Acclaim® 2220N, 150 g Cap-HDO, 92 g HQEE, 5 g Irganox® 1010, 5 g Tinuvin® 234 and 50 ppm DBTL (with reference to the amount of polyol) was heated to 130° C. by agitating with an impeller agitator at a speed of 500 revolutions per minute (rpm). Then 236 g HDI were added. Then it was agitated to the maximum possible increase in viscosity and then the TPU was poured.

The material was subsequently heat treated for 30 minutes at 80° C. and then granulated. This material was used as the basic material for examples 4 to 10.

Masterbatches or silicon oil (the precise formulations are given in table 1) and colouring (2% by weight with reference to TPU, Elftex® 435 from the Cabot company) were added to the TPU granulates, which were produced according to the general descriptions. The mixtures were extruded on an extruder of the type DSE 25, 4 Z, 360 Nm made up as follows:
1. cold feed area with conveying elements,
2. first heating area (165° C.) with first mixing area,
3. second heating area (175° C.) with conveying elements and second mixing area,
4. third heating area (180° C.) with mixing area, conveying elements and vacuum degasification,
5. deflector head (185° C.) and nozzle (180° C.), with a delivery rate of 10 kg/h at a speed of 220 rpm, then processed into granulate with a strand granulator and into moulded plates with an injection moulding machine.

Determination of technical processability:

Special attention was given to technical processability at different temperatures (150 to 210° C.) and pressures when injection moulding. For example feed behaviour in the hopper of the injection moulding machine was assessed. It was verified whether delamination, disturbances and/or an overlay on the moulded part were visible. The speed of formation of the overlay on the moulded part and its thickness were also assessed. The following marks were given to assess the formation of the overlay:

Mark 1: no overlay visible;
Mark 2: little overlay visible and also does not become thicker;
Mark 3: little overlay visible, but becomes thicker and thicker after further shots;
Mark 4: lot of overlay quickly, which also rapidly becomes thicker with further shots;
Only mark 1 is very good, mark 2 is acceptable.

Determination of Surface Sensitivity

To determine surface sensitivity two tests were carried out:

Crockmeter test: These tests were carried out on an injection moulding with a grained surface under the following conditions:
Rubbing pressure: 10 N, rubbing path: 260 mm, rubbing time: 15 seconds, number of strokes: 100.

Carrying out: The cotton abrasive fabric was tightened under the bearing area and the test was carried out under the conditions described above. Damage to the surface was assessed qualitatively. The mark "bad" means clearly visible abrasion of the surface. The mark "good" means no or hardly any visible abrasion.

Scratching test: This test was carried out with an Erichsen rod with a stroke and a force of 10 N on a grained surface. Damage to the surface was assessed qualitatively. The mark "bad" means clearly visible damage to the surface. The mark "good" means no or hardly any visible surface damage.

The results of the examinations are given in the tables.

TABLE

Results

| Example | Type of example, TPU | Batch; Amount of siloxane [%] + silica [%] in TPU-1 or -2 | Amount M350 [%] | Technical processability (overlay) | Crockmeter test | Scratching test |
|---|---|---|---|---|---|---|
| 1 | comparison, TPU-1 | none | none | Mark 1 | bad | bad |
| 2 | comparison, TPU-1 | MB50-027; 2.5 | 0.5 | Mark 2 | good | good |
| 3 | according invention, TPU-1 | to the MB40-817; 3.6 | 0.5 | Mark 1 | good | good |
| 4 | comparison, TPU-2 | none | none | Mark 1 | bad | bad |
| 5* | comparison, TPU-2 | MB50-027; 2.5 | none | Mark 4 | good | good |
| 6* | comparison, TPU-2 | MB50-027; 2 | 0.5 | Mark 3 | good | good |
| 7* | comparison, TPU-2 | MB50-027; 3.0 | 1 | Mark 2 | good | good |
| 8 | according to the invention, TPU-2 | MB40-817; 3.0 | 1 | Mark 1 | good | good |
| 9 | according to the invention, TPU-2 | MB40-817; 4.2 | 0.5 | Mark 1 | good | good |
| 10* | comparison, TPU-2 | none | 25 | Mark 1 | good | bad |

*Surface disturbances and/or delamination occurred in these injection tests.

In examples 1 to 3 an aromatic TPU (TPU-1) was used. Without polyorganosiloxane (example 1) surface resistance is bad. With the use of high molecular polyorganosiloxane (example 2) the result of the crockmeter test was good and the scratching test was passed, though technical processability was not optimum. The TPU in example 3 with the use of high molecular polyorganosiloxane and silica met all the requirements regarding surface sensitivity and achieved very good technical processability.

In examples 4 to 10 an aliphatic TPU (TPU-2) was used. In comparative examples 4 no polyorganosiloxane, in comparative example 10 only a low molecular weight polyorganosiloxane, in example 5 only a high molecular polyorganosiloxane and in comparative examples 6 and 7 mixtures of a high molecular and a low molecular polyorganosiloxane was used. The TPU in examples 4 and 10 showed a bad result in the scratching test. In example 10 there were also found problems in the hopper of the injection moulding machine. The material in examples 5 and 6 had good surface resistance, though it showed problems with technical processability. In examples 5, 6, 7 and 10 there were more or less serious problems with delamination and formation of the overlay, no continuous processing free from disturbance was possible.

The TPU in examples 8 and 9 according to the invention with the use of high molecular weight polyorganosiloxane, low molecular weight polyorganosiloxane and silicon dioxide met all the requirements regarding surface sensitivity, showed very good technical processability with a large processing window and there were no delamination problems at all temperature and pressure settings when processing by injection moulding. Continuous processing without any problem was possible.

The invention claimed is:

1. A thermoplastic polyurethane, obtained from components comprising
    a) at least one organic diisocyanate,
    b) at least one low molecular polyol having an average of from 1.8 to 3 Zerewitinoff-active hydrogen atoms and having a number average molecular weight $M_n$ of from 60 to 400 g/mol, and
    c) at least one further polyol having an average of from 1.8 to 3 Zerewitinoff-active hydrogen atoms and having a number average molecular weight $M_n$ of from 450 to 10,000 g/mol,
    e) optionally a catalyst,
    f) optionally additives and/or auxiliary materials, and/or
    g) optionally chain breakers,
    wherein the ratio of isocyanate groups in component a) to isocyanate reactive groups, in components b), c) and, if present, g) is from 0.9:1 to 1.1:1, and
    wherein the thermoplastic polyurethane comprises
    d) from 0.4 to 10% by weight, based on the thermoplastic polyurethane, of a mixture which comprises
        d1) from 0.1 to 4% by weight, based on the thermoplastic polyurethane, of at least one amorphous and/or crystalline silicon dioxide, and
        a polyorganosiloxane mixture of the formula $(R_2SiO)_n$, wherein $R_2$ represents an organic hydrocarbon residue which may be made linear and/or branched, and has 1 to 27 carbon atoms, and n represents an integer from 3 to 8,000, wherein the polyorganosiloxane mixture consists of
        d2) 0 to 2% by weight, based on the thermoplastic polyurethane, of at least one polyorganosiloxanes of the formula $(R_2SiO)_n$, wherein n is from 3 to 300 and
        d3) 0.2 to 8% by weight, based on the thermoplastic polyurethane, of at least one polyorganosiloxanes of the formula $(R_2SiO)_n$ wherein n is from 1,000 to 8,000.

2. A moulded part or skin comprising the thermoplastic polyurethane according to claim 1.

3. A method comprising injection moulding at least the thermoplastic polyurethane according to claim 1.

4. A method comprising extruding at least the thermoplastic polyurethane according to claim 1.

5. A method comprising subjecting at least the thermoplastic polyurethane according to claim 1 to a powder slush process.

6. A method comprising fitting out the inside of a motor vehicle with a material which comprises the thermoplastic polyurethane according to claim 1.

7. The thermoplastic polyurethane of claim 1, wherein the organic diisocyanate is 1,6-hexamethylene diisocyanate, 1,4-cyclohexane diisocyanate, iso-phorone diisocyanate, dicyclohexylmethane diisocyanate, diphenylmethane diisocyanate isomer mixtures with a 4,4'-diphenylmethane diisocyanate content of more than 96% by weight, 4,4'-diphenylmethane diisocyanate, 1,5-naphthylene diisocyanate, or mixtures thereof.

8. The thermoplastic polyurethane of claim 1, wherein the low molecular polyol is ethanediol, 1,2-propanediol, 1,3-propanediol, 1,4-butanediol, 2,3-butanediol, 1,5-pentanediol, 1,6-hexanediol, 1,10-decanediol, 1,12-dodecanediol, diethylene glycol, dipropylene glycol, 1,4-cyclohexanediol, 1,4-dimethanol cyclohexane, neopentyl glycol, or mixtures thereof.

9. The thermoplastic polyurethane of claim 7, wherein the low molecular polyol is ethanediol, 1,2-propanediol, 1,3-propanediol, 1,4-butanediol, 2.3-butanediol, 1,5-pentanediol, 1,6-hexanediol, 1,10-decanediol, 1,12-dodecanediol, diethylene glycol, dipropylene glycol, 1,4-cyclohexanediol, 1,4-dimethanol cyclohexane, neopentyl glycol, or mixtures thereof.

10. The thermoplastic polyurethane of claim 1, wherein the polyol c) is polyester diol, polyether diol, polycarbonate diol, or mixtures thereof.

11. The thermoplastic polyurethane of claim 9, wherein the polyol c) is polyester diol, polyether diol, polycarbonate diol, or mixtures thereof.

12. The thermoplastic polyurethane of claim 1, wherein the catalyst e) is required and is titanic acid ester, iron compound, tin compound, zircon compound, bismuth compound, or mixtures thereof.

13. The thermoplastic polyurethane of claim 1, wherein the additives and/or auxiliary materials f) are required and are fatty acid ester, metal soap from fatty acid ester, fatty acid amide, fatty acid ester amide, anti-blocking agent, flame protection agent, softener, or mixtures thereof.

14. The thermoplastic polyurethane of claim 1, wherein the chain breaker g) is required and is butyl, dibutylamine, octylamine, stearylamine, N-methyl-stearylimine, pyrrolidine, piperidine, cyclohexylamine, butanol, 2-ethylhexanol, octanol, dodecanol, stearyl alcohol, amyl alcohol, cyclohexanol, ethylene glycol monomethyl ether or mixtures thereof.

15. The thermoplastic polyurethane of claim 1, wherein the following are required
    e) a catalyst,
    f) additives and/or auxiliary materials, and
    g) chain breakers.

* * * * *